United States Patent [19]
Patel et al.

[11] 4,407,532
[45] Oct. 4, 1983

[54] HOSE END FITTING

[75] Inventors: Hiralal V. Patel, Mentor; Samuel A. Rudolph, Cleveland Heights, both of Ohio

[73] Assignee: Dana Corporation, Toledo, Ohio

[21] Appl. No.: 228,317

[22] Filed: Jan. 26, 1981

[51] Int. Cl.³ ............................................. F16L 33/20
[52] U.S. Cl. .................................... 285/256; 285/259
[58] Field of Search .............................. 285/256, 259

[56] References Cited

U.S. PATENT DOCUMENTS

| | | | |
|---|---|---|---|
| 1,810,268 | 6/1931 | Dold | 285/256 X |
| 3,423,109 | 1/1969 | New et al. | 285/256 X |
| 3,549,180 | 12/1970 | MacWilliam | 285/256 |
| 4,111,469 | 9/1978 | Kauick | 285/256 |
| 4,226,446 | 10/1980 | Burrington | 285/256 |

FOREIGN PATENT DOCUMENTS

| | | | |
|---|---|---|---|
| 2412778 | 7/1979 | France | 285/256 |
| 1173798 | 12/1969 | United Kingdom | 285/256 |

*Primary Examiner*—Thomas F. Callaghan
*Attorney, Agent, or Firm*—Pearne, Gordon, Sessions, McCoy, Granger & Tilberry

[57] ABSTRACT

A hose coupling includes an insert and a sleeve extending over the outer surface of the hose. The sleeve is crimped radially inward to secure the coupling to the hose and the sleeve has a plurality of grooves on the outer surface increasing in depth progressively away from the end of the hose to reduce the amount of material in the wall of the sleeve and thereby reduce the amount of force required to crimp the sleeve onto the hose.

4 Claims, 3 Drawing Figures

HOSE END FITTING

BACKGROUND OF THE INVENTION

This invention relates generally to metallic end fittings for flexible, reinforced hydraulic hose and, more particularly, to such end fittings which are crimped in place on the end of the hose and which are particularly adapted for use with large size and very high pressure hose.

Hydraulic hose generally includes an inner liner of rubber or plastic material which is selected particularly for its sealing capabilities and chemical compatibility with fluid to be conducted through the hose, together with an external reinforcing layer which may be of textile material for low pressure hose but generally is of metallic wire for larger diameter and higher pressure hose. This reinforcing layer may be applied by either braiding or spiral wrapping, and may consist of a plurality of layers embedded in or layered with rubber material which may be the same as or different from the liner and serves to lock the braid in place. In addition, the hose may have an outer cover of rubber material to protect the reinforcing layer against rust and corrosion, as well as abrasion, depending upon the environment in which the hose is used. Naturally, the reinforcing layers must be increasingly stronger, and hence thicker, as the hose size increases or the pressure increases, since the reinforcing layer must serve not only to provide hoop strength against the bursting forces from the hydraulic pressure within the hose but also to provide axial tensile strength because of the tensile forces on the hose as a result of the internal pressure.

When such hose is used in hydraulic systems, it is necessary to provide end fittings to make suitable connection with the other parts of the hydraulic system, and such hose end fittings must not only make good sealing engagement with the hose, and particularly the inner liner, to prevent leakage, but also must provide a suitable grip on the reinforcing layer to ensure that the hydraulic internal forces, as well as any external forces, prevent axial separation of the end from the hose. Generally, such hose end fittings include an insert which extends within the liner of the hose as well as a sleeve or collar that extends over the outside of the hose, and the insert and the sleeve must be compressed radially toward each other to provide the necessary mechanical grip on the hose. The hose fitting also includes an end fitting portion which may have threads or any other suitable construction for making connection with the rest of the hydraulic circuit and which is usually an integral part of the insert to provide hydraulic continuity within the interior of the fitting.

Such hose end fittings are generally of two different kinds. One kind, generally called the "reusable type" fitting, is made for assembly on the hose end in the field with a minimum of tools, and because of the specialized nature of such fittings, they are generally high in cost, although if the hose end is damaged, they may be taken apart, separated from the damaged hose, and assembled again on a new piece of hose. However, a much more common type of hose end fitting is the "permanently attached" type, which is secured on the hose end by plastic deformation of various parts, usually the outer sleeve, of the metal fitting, which heretofore has required large and expensive machinery suitable only for use at main assembly plants.

Thus, it has generally been a decision to use a high-priced reusable type fitting if it is expected that the hose will require replacement in the field, since the use of factory-assembled, permanent type hose ends requires that the entire assembly of the hose and the fitting at each end be replaced, which is complicated because of the variations in the type of end fitting, type of hose, and length of hose, depending upon the particular application of the hose assembly.

To overcome these problems, there are now available relatively inexpensive and portable machines for crimping permanent type hose ends on the hose by the use of a hydraulically powered unit, which, together with conical camming surfaces, causes multiple die section segments to move radially inwardly to crimp the outer sleeve of the hose end in place on the hose. Because such machines are inexpensive and relatively portable, they can be used by dealers and jobbers to provide easy and rapid assembly of hose ends on hoses of any length, and may even be used in the field by customers having sufficient need for manufacturing their own replacement hose assemblies.

However, there has been a problem with these hose assembly machines in that they are generally adapted only to relatively smaller size hose ends, particularly when high and very high pressure hose is used, because the amount of physical force they can apply in crimping a hose end in place is somewhat limited. This is because with larger sizes and with heavier reinforcing layers it is necessary to thicken the wall of the sleeve so that after crimping has taken place, it has sufficient rigidity to be able to maintain a tight grip on the braid. Thus, because of changes in dimensions of different types of hose, each hose end assembly is specifically designed for use with a particular type of hose with regard to dimensions and type of braid layer as well as hose diameter.

SUMMARY OF THE INVENTION

The present invention provides an improved, permanently attached hose end particularly adapted for use with large diameter and extra high pressure hose which is permanently attached to the end of a hose by a radial crimping action, and which provides a maximum amount of strength of the coupling for gripping the hose while requiring a relatively minimum amount of force during the crimping action to deform the sleeve radially inwardly.

The coupling includes a body member having a fitting portion arranged for connection to other parts of a hydraulic circuit and an integral insert portion adapted to fit within the inner liner of the hose and having on its external surface a plurality of spaced annular grooves adapted to make tight sealing engagement with the hose liner. A collar of sleeve extends over the outside of the hose for substantially the same distance as the length of the insert within the hose, and has an inturned portion adapted upon a radially inward swaging action to be received within a groove on the body member to hold the sleeve in place. Along the inner periphery of the sleeve are a plurality of relatively sharp, annular ridges which are arranged to engage the outer surface of the hose, and preferably engage the reinforcing braid directly if the outer cover has been removed. The outer surface of the sleeve has a plurality of annular grooves positioned to interspace the annular ridges on the inside of the sleeve and these annular grooves are of progressively greater depth away from the end of the hose and toward the free end of the collar.

When the collar is crimped radially inwardly in a crimping machine, the entire sleeve is decreased in diameter and the portions where the inner annular ridges are located have the full radial thickness, so that after crimping they have the maximum strength against deformation to tightly grip the hose. The portions between the annular ridges are also deformed radially inwardly but have a progressively decreasing wall thickness away from the end of the hose. These do not affect the gripping action of the annular ridges, since these portions do not grip the hose but, rather, provide strength in axial tension which increases with increasing wall thickness toward the end of the hose. Thus, the outermost annular ridge portion of the sleeve, that is, farthest away from the end of the hose, has a minimum wall thickness between it and the adjacent annular ridge closer to the end of the hose, and this wall thickness increases progressively since, under tension, the tensile forces will be greater toward the end of the hose, reflecting the fact that there are an increasing number of annular ribs gripping the hose and, hence, placed in axial tension by the hydraulic forces within the hose. Because of these reduced diameter grooves on the outer surface of the sleeve, the total mass of the sleeve, and hence the amount of material that must be deformed under the radially inward crimping action, is substantially decreased to allow the crimping to take place with less force while still providing sufficient wall thickness to withstand the axial tension loads depending upon the axial position along the sleeve.

BRIEF DESCRIPTION OF THE DRAWINGS

The foregoing and additional aspects and advantages of the invention will become more readily apparent upon an understanding of the preferred embodiment of the invention, as shown in the accompanying drawings, wherein.

DESCRIPTION OF THE PREFERRED EMBODIMENT

Figure 1:
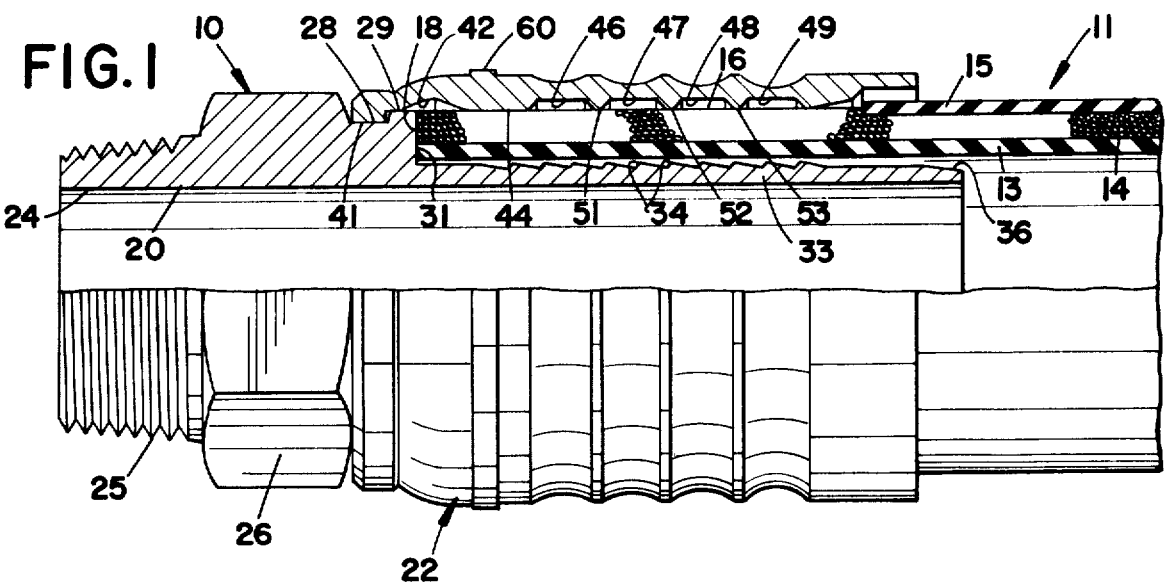
FIG. 1 is a longitudinal view, partially in cross section, of a hose end assembly in place on the end of a reinforced, flexible hose prior to crimping.

Referring now to the drawings in greater detail, FIG. 1 shows a hose end 10 with the end of a hose 11 in place on the hose end 10 immediately prior to the crimping operation. The hose 11 is of a high pressure type having an inner tubular layer 13 formed of a material compatible with the fluid within the hose, and the inner tube 13 is surrounded by a reinforcing layer 14 of metallic wire or the like, which in turn is covered by an abrasion-resistant outer cover 15. The outer cover 15 is skived or removed on the end portion 16 fitting within the hose end to expose the reinforcing layer 14 for gripping purposes, as will be explained in greater detail hereinafter. The hose 11 terminates in a cut end surface 18 preferably lying in a plane normal to the axis of the tube, and for purposes of orientation the term "outer" will be used in reference to the hose so that the portion adjacent the cut end 18 is the "outer" end, while the portion towards the outer cover 15 is considered the "inner" end. The same terminology is used with respect to the hose end itself.

The hose end assembly consists of an insert member 20 and a sleeve or collar member 22 extending over the outer skived portion 16 of the hose 11. The insert member 20 is formed with an axially extending bore 24 which terminates at the outer end in a threaded portion 25 adapted to make connection with other parts of a hydraulic system. Immediately inward of the threaded portion 25 is an enlarged portion having wrench flats 26, and inward of that is an annular groove 28 and an annular ridge 29 which, in turn, terminates at the inner end in a radially extending shoulder 31 adjacent the cut hose end 18. An insert portion 33 extends from the shoulder 31 within the hose inner layer 13 and is provided on its exterior surface with a plurality of closely spaced, annular ridges 34 adapted to make gripping and sealing engagement with the hose inner tube 13. The innermost end of the insert portion 33 terminates in a conical tapered portion 36 of reduced diameter adapted to aid in the insertion of the insert member 20 within the hose during assembly.

Figure 3:
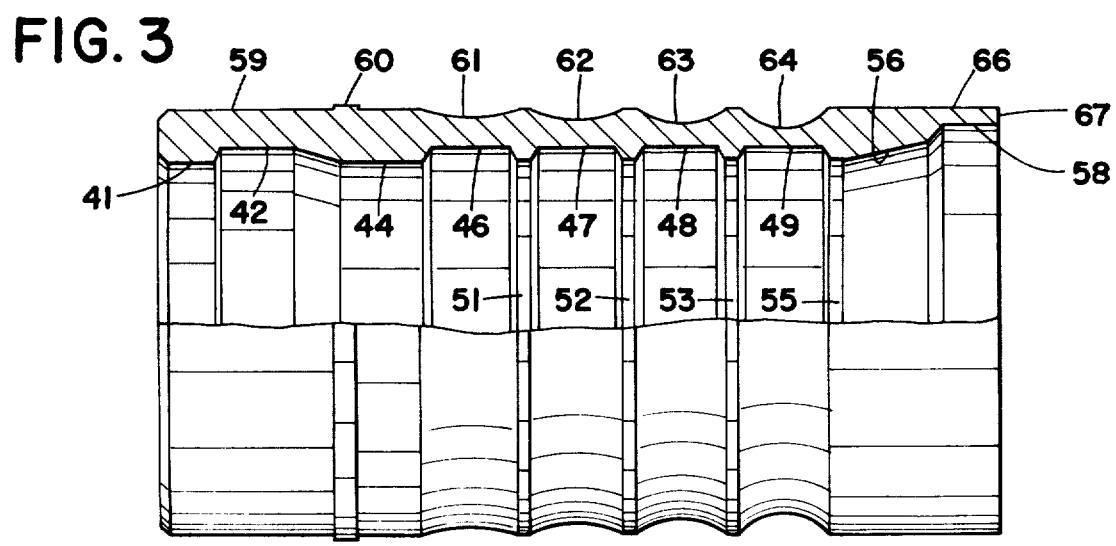
FIG. 3 is an enlarged view, partly in section, of the sleeve or collar of the hose end assembly shown in FIGS. 1 and 2.

The sleeve or collar member 22 (see FIG. 3) at its outer end has an inwardly turned annular ridge 41 adapted to engage the groove 28, and prior to the crimping operation, the annular ridge 41 has a sufficiently large diameter to pass over the annular ridge 29 on the insert to allow the positioning of the members as shown in FIG. 1. Inwardly of the annular ridge 41, the sleeve member 22 has an annular recess 42 adapted to overlie the annular ridge 29, and inwardly of that is a wide annular ridge 44 having an inside diameter to make close contact with the skived end portion 16 of the hose prior to the crimping operation. In the embodiment shown, the sleeve then has four annular grooves 46, 47, 48, and 49 of equal shape and spacing, and progressing inwardly from the wide annular ridge 44. These annular grooves 46-49 define between them relatively sharp annular ridges 51, 52, and 53, and at its inner side annular groove 49 terminates in another ridge 55 having a sloping conical inner side 56 terminating in an enlarged counterbore 58. It will be understood that prior to the crimping operation, the inner annular ridge 44, the three sharp ridges 51, 52, and 53, and the innermost ridge 55 are all substantially of the same diameter.

The outer surface of the sleeve member 22 is provided at its outer end with a smooth, cylindrical outer portion 59 which is broken only by a small annular ridge 60, which may be formed by knurling to raise it above the diameter of the cylindrical portion 49, and this ridge 60 is provided solely for positioning the hose and hose assembly in the crimping dies during the crimping operation. Inwardly from the cylindrical outer portion 59 are located four outer grooves 61, 62, 63, and 64, which overlie the internal annular grooves 46-49. As can be seen, each of the grooves 61-64 has a relatively shallow, arcuate shape, and while all of the grooves have the same width, each is of progressively greater depth towards the inner end of the hose so that the outer groove 61 is relatively shallow, while the innermost groove 64 is relatively deep. Since all of the internal annular grooves 46-49 have the same inner diameter, this means that the wall thickness of the sleeve member at each of the outer grooves 61-64 becomes progressively thinner toward the inner end of the hose and hose end so that the outermost portion between the outer groove 61 and inner annular groove 46 is the thickest, while that wall portion between the innermost outer groove 64 and the innermost inner annular groove 49 has the thinnest wall portion. Inwardly of the groove 64, the sleeve outer surface includes a smooth, cylindrical portion 66 overlying in axial alignment the sloping side 56 and counterbore 58, and this terminates at its innermost end a radial end wall 67.

Before the hose end can be assembled on the hose, it is first necessary to secure the insert member 20 and sleeve member 22 together as a unit. To do this, the two members are placed in a suitable crimping machine which applies crimping forces only in the zone adjacent the annular ridge 29 on sleeve 22 so that this portion is forced into the annular groove 28 on the insert member 20. While this can be done at the time of assembly with the hose end, it is preferable that it be done ahead of time when the parts are originally manufactured to ensure that the proper sleeve and insert are assembled together for a particular size and construction of the hose. Therefore, when the hose end assembly consisting of the insert and sleeve are to be assembled on the hose, it is first necessary to remove the outer cover of the hose for the proper distance to expose the reinforcing layer 14. After this is done, the hose end assembly is pressed onto the hose, with the insert member portion 20 being forced within the inner tubular portion 13 and the sleeve member 22 passing over the skived end portion 16 until the cut end 18 of the hose 11 abuts firmly against the shoulder 31, and after this has been done, the assembly is ready for the crimping operation.

Figure 2:
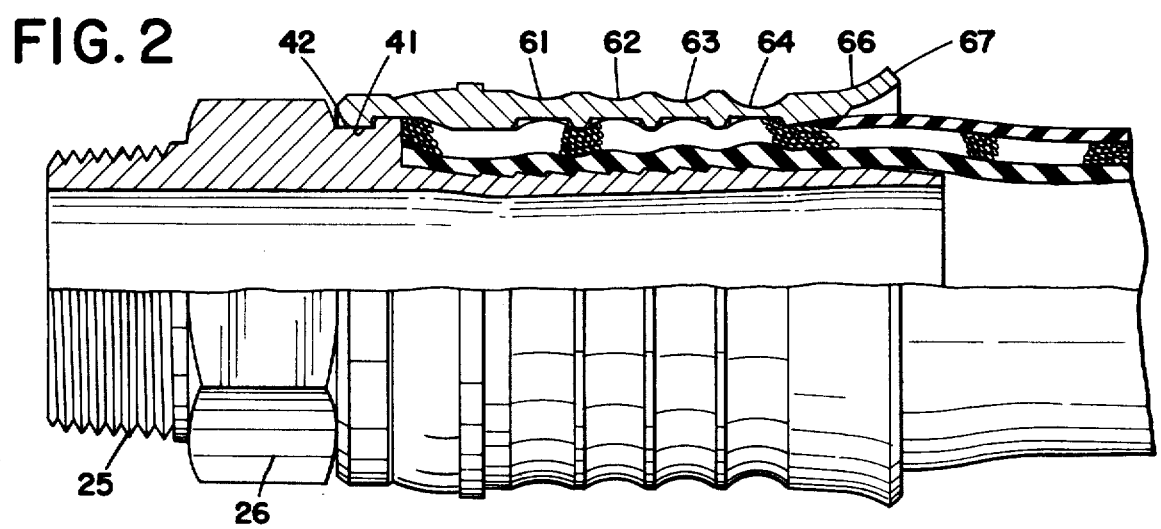
FIG. 2 is a view similar to FIG. 1, but showing the hose end assembly and hose after crimping.

The assembly is then placed in a suitable crimping machine which applies radially inwardly directed forces to the outer surface of the sleeve member 22 to deform it radially inward from the original configuration, as shown in FIG. 1, to the fully crimped and assembled position shown in FIG. 2. Such crimping action takes place in a machine in which a plurality of fingers or segments have surface portions adapted to engage almost the entire periphery of the sleeve and which can then be forced radially inward simultaneously through a predetermined radial distance. Since the segments cover almost the entire outer periphery of the sleeve 22, at least in a given axial zone, the only deformation that the material of the sleeve can do is to be compressed and be moved radially inwardly to a lesser diameter. As examples of machines which are designed and adapted to perform this crimping action, such machines are shown in U.S. Pat. No. 3,720,088; No. 3,742,754; No. 3,750,452; and No. 3,851,514, all of which are assigned to the assignee of this application.

When the sleeve is crimped radially inwardly to grip the hose 11, it is important that the crimping forces be applied, and hence the sleeve be deformed inwardly, only in the zone of the external grooves 61-64 as well as a portion of the smooth, cylindrical portion 66. Accordingly, the positioning ridge 60 can be used to position the hose assembly with respect to the crimping dies so that the crimping takes place only in the zone outwardly from the ridge 60, and since the sleeve has a relatively long, thick wall portion at the right annular ridge 44, it will still be deformed sufficiently to provide a good seal at the shoulder 31 to prevent leakage at the joint between the insert and the sleeve.

After the crimping has been completed, the outer surface of the sleeve outwardly of the positioning ridge 60 will have been deformed radially inwardly to the same extent so that the outer surface portions on each side of the grooves 61-64 will have the same external diameter. The three ridges 51, 52, and 53, since they have the same inner diameter, will be forced radially inward the same extent and provide substantially the same gripping action on the hose at each of these zones. However, the axial tension force applied to the sleeve member 22 as the result of tension between the hose 11 and the hose end 10, either because of internal hydraulic pressure or external forces, will vary along the axial length of the sleeve member. Because there is gripping at only one point at the ridge 55, the portion of the sleeve between ridges 53 and 55 will have a minimum of axial tension stress and the wall thickness of this portion as defined by the depth of the outer annular groove 64 can be at a minimum. Because zones extending progressively toward the outer end of the hose result in increasing gripping forces because they include additional annular ridges, the axial tension forces in the sleeve at the other outer grooves 63, 62, and 61 will be increasingly greater toward the outer end of the hose and, therefore, these grooves are made progressively less deep to allow more material in the sleeve at points of progressively greater applied stress. However, because the wall thicknesses of the sleeve member 22 are reduced by the amount of material removed from the grooves 61, 62, 63, and 64, this material need not be deformed inwardly and the entire crimping action can take place with substantially less applied force than if these grooves were not present and the sleeve member 22 had a smooth, cylindrical outer periphery. It should also be noted that the crimping force as applied over the smooth inner portion 66 of the sleeve member 22 terminates short of the end wall 67, but does force the conical sloping side 56 and counterbore 58 into sealing contact with the outer cover 15 to prevent dirt and water from coming into contact with the reinforcing layer 14. The end wall 67 is not crimped inwardly, and the deforming action causes this to flare outwardly, as shown in FIG. 2, so that it does not tightly grip the hose at this point and provides a strain release to allow bending of the flexible hose with respect to the hose end and prevents any possible cutting of the hose outer cover 15.

While the preferred embodiment of the present invention has been shown and described in particular detail, it is understood that various modifications and rearrangements may be made without departing from the scope of the invention as defined in the following claims.

What is claimed is:

1. A hose end assembly comprising a metal hose coupling and a flexible reinforced hose having an inner bore, an outer surface, and an end surface, said hose coupling including an insert portion within said hose bore and a radial abutment adjacent said hose end surface, said hose coupling including a sleeve member secured to said insert member on the side of said abutment away from said hose end surface, said sleeve and insert portion cooperating to form an annular axially extending hose receiving zone, said sleeve extending inwardly over the hose outer surface and being deformed radially inward to make gripping contact with said hose outer surface in said hose receiving zone, said insert portion radially internally supporting the hose area gripped by said sleeve in said hose receiving zone, said insert portion having a plurality of uniformly axially spaced, radially outwardly extending annular ridges in engagement with said hose inner bore, each of said annular insert ridges having substantially the same cross-sectional shape and size in a longitudinal plane, said sleeve on its inner surface adjacent said hose outer surface having at least three uniformly axially spaced, radially inwardly extending annular ridges in gripping engagement with said hose outer surface in said hose receiving zone, each of said annular sleeve ridges having substantially the same cross-sectional shape and size in a longitudinal plane, the number of insert ridges in said hose receiving zone being greater than the number of sleeve ridges, said sleeve having a plurality of annular grooves on its outer surface with each axial groove being in axial alignment with a space between adjacent inwardly extending annular sleeve ridges, said grooves being progressively deeper axially away from the hose end surface to provide progressively decreasing radial thickness of said sleeve at portions extending progressively away from said hose end surface, the hose receiving zone bounded radially outwardly by said sleeve ridges and radially inwardly by said insert ridges having substantially the same hose receiving volume per unit length along substantially its full length.

2. A hose end assembly as set forth in claim 1, wherein each of said grooves is arcuate in shape.

3. A hose end assembly as set forth in claim 1, wherein all of said grooves have the same axial width.

4. A hose end assembly as set forth in claim 1, wherein said hose outer surface within said sleeve is a metallic wire reinforcement layer.

* * * * *